(12) United States Patent
Arya et al.

(10) Patent No.: US 6,219,203 B1
(45) Date of Patent: Apr. 17, 2001

(54) MICROACTUATOR INTEGRATED LEAD SUSPENSION FOR A HIGH DENSITY HARD DISK DRIVE

(75) Inventors: Satya P. Arya; Tzong-Shii Pan, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/290,005

(22) Filed: Apr. 12, 1999

(51) Int. Cl.[7] ........................................................ G11B 5/48
(52) U.S. Cl. ...................................... 360/244.2; 360/245.4
(58) Field of Search ............................... 360/244.2, 244.3, 360/244.5, 244.9, 244.8, 245.1, 245.4

(56) References Cited

U.S. PATENT DOCUMENTS

| | | |
|---|---|---|
| 4,996,616 | 2/1991 | Aoyagi et al. . |
| 5,126,904 | 6/1992 | Sakurai . |
| 5,313,353 | 5/1994 | Kohso et al. . |
| 5,353,181 | 10/1994 | Frater et al. . |
| 5,461,525 | 10/1995 | Christianson et al. . |
| 5,734,526 | 3/1998 | Symons . |
| 5,759,418 | 6/1998 | Frater et al. . |

FOREIGN PATENT DOCUMENTS 6028801  2/1994  (JP) .

*Primary Examiner*—Allen T. Cao
(74) *Attorney, Agent, or Firm*—Douglas R. Millett; Felsman, Bradley, Vaden, Gunter & Dillon, LLP

(57) ABSTRACT

A hard disk drive suspension having a load beam with an original thickness of 4 mils (approximately 0.1 mm) is simultaneously etched on both sides in selected areas to approximately half of its original thickness. The selective partial etching makes intricate features which are otherwise unattainable by conventional forming operations. These features reduce the weight of the load beam and provide a very stiff structure when the etched features or pockets are enclosed in an extended, box-like fashion by a flexure and mount plate. The only press forming operations remaining are to generate a load/unload tab semicircular cross-section and dimple. This configuration more than triples the first torsion frequency from about 2 to 6 KHz or higher, thereby increasing the servo band width by a multiple of 3. Moreover, when the box-like portion of the suspension is replaced by milliactuator motors, the etched suspension meets the mass, inertia, sag, and servo bandwidth requirements with micro-actuation capability.

14 Claims, 3 Drawing Sheets

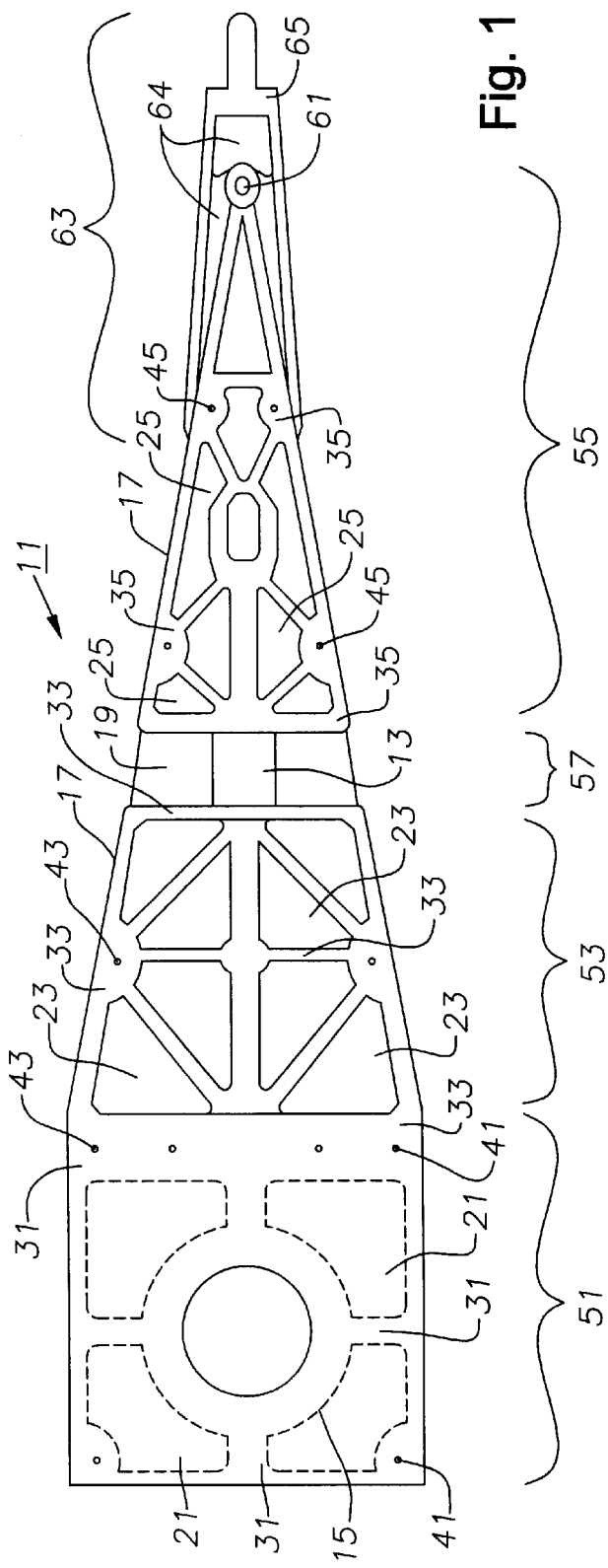
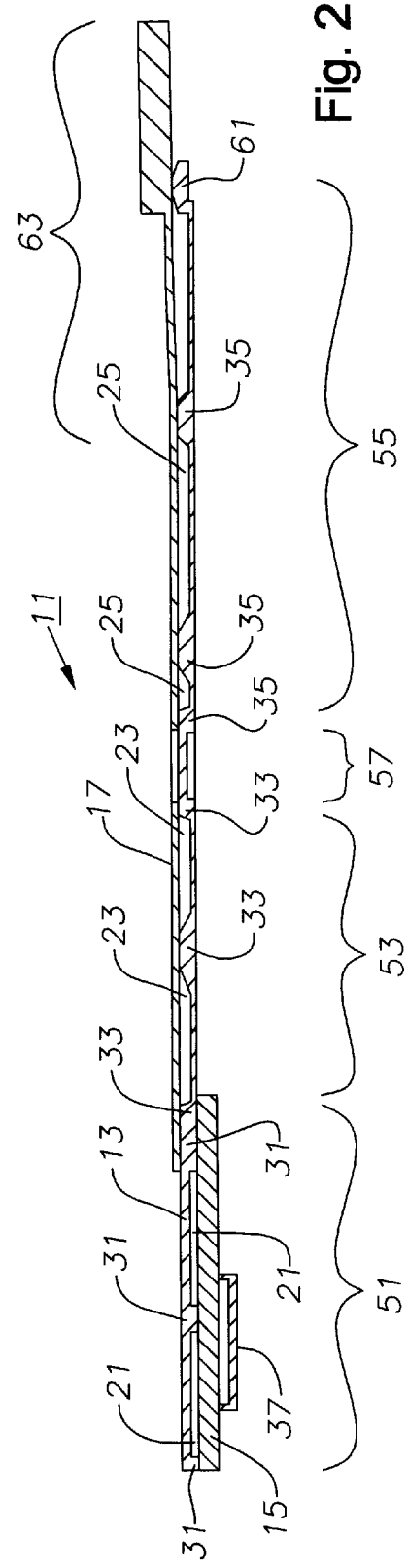

MICROACTUATOR INTEGRATED LEAD SUSPENSION FOR A HIGH DENSITY HARD DISK DRIVE

BACKGROUND OF THE INVENTION

This invention relates in general to a hard disk drive suspension and in particular to an etched microactuator suspension for a high density computer hard disk drive.

Background Art

As the information storage density of computer hard disk drives has increased, so has the need for microactuator suspensions with very low profiles or thicknesses. Lightweight suspensions allow for higher tracking-per-inch (typically, 40K TPI) and greater drive speeds. Although suspensions having thicknesses in the range of 1.0 to 2.5 mils (approximately 0.03 to 0.063 mm) are well known in the art, they are prone to experience a variety of problems. For example, suspensions having a thickness on the lower end of this range are not as stiff and subject to air flow induced vibration, have marginal dynamics (typically around 2 KHz for the first major torsional dynamic frequency), and increased manufacturing cost. Suspensions on the upper end of the range have greater stiffness, but they have increased inertia which can limit the speed of the drive.

Prior art suspension shapes are typically created by two-sided chemical etching processes and supplemental press forming procedures to increase their stiffness. A low percentage of suspensions are partially etched, with etching typically limited to the hinge and gimbal. These suspensions do not use etching for stiffening purposes. They are typically etched to 50% of their original thickness to reduce normal stiffness in the hinge region and to form a low stiffness gimbel at the front end of the load beam. Current designs utilize a full hard thin (1.5 to 2.5 mils) stainless steel load beam having a cross-section which is stiffened by forming rails, bubbles, etc., to raise their dynamic frequencies. Unfortunately, only very simple forms can be made due to manufacturability problems that limit dynamic enhancement. One type of prior art, short length suspension alleviates this shortcoming with a relatively thick 4 mil load beam. However, at a length of only 18 mm, it performs rather poorly in other areas due to the increased mass of the load beam.

SUMMARY OF THE INVENTION

A hard disk drive suspension having a load beam with an original thickness of 4 mils (approximately 0.1 mm) is simultaneously etched on both sides in selected areas to approximately half of its original thickness. The selective partial etching makes intricate features which are otherwise unattainable by conventional forming operations. These features reduce the weight of the load beam and provide a very stiff structure when the etched features or pockets are enclosed in an extended, box-like fashion by a flexure and mount plate. The only press forming operations remaining are to generate a load/unload tab semicircular cross-section and dimple. This configuration more than triples the first torsion frequency from about 2 to 6 KHz or higher, thereby increasing the servo band width by a multiple of 3. Moreover, when the box-like portion of the suspension is replaced by milliactuator motors, the etched suspension meets the mass, inertia, sag, and servo bandwidth requirements with micro-actuation capability.

BRIEF DESCRIPTION OF THE DRAWINGS

FIG. 1 is a top view of a first embodiment of an integrated lead suspension for a hard disk drive and is constructed in accordance with the invention.

FIG. 2 is a sectional side view of the suspension of FIG. 1.

BEST MODE FOR CARRYING OUT THE INVENTION

Figure 3:
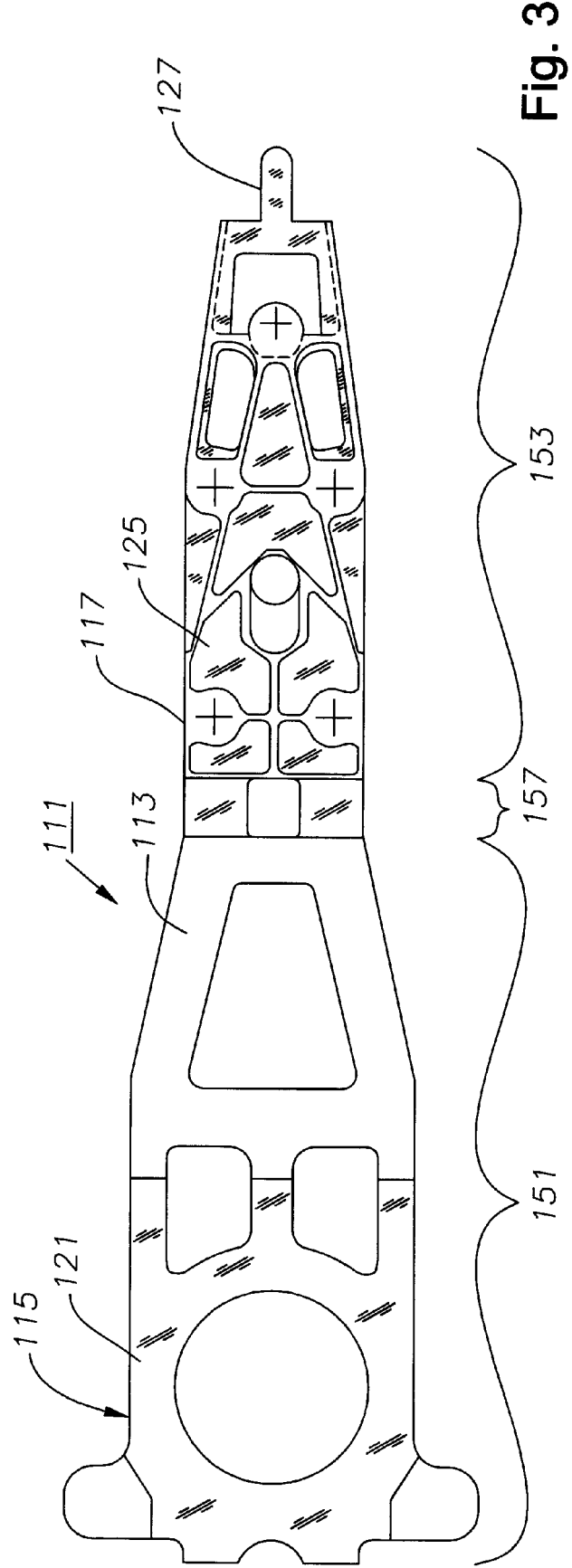
FIG. 3 is a top view of a second embodiment of the suspension of FIG. 1.

Referring to FIGS. 1 and 2, a first embodiment of an integrated lead suspension 11 for a high density hard disk drive is shown. Suspension 11 comprises a central load beam 13, a mount plate 15 on the rearward end of its lower surface, and a flexure 17 covering the rear, middle and forward end, respectively of its upper surface. Load beam 13 is formed from a specimen having an original and uniform thickness of approximately 4 mils.

As shown in FIGS. 1 and 2, load beam 13 was subjected to double-sided etching in selected areas to reduce its thickness in those areas. A honeycomb-like ribbed structure is simultaneously etched on both sides of load beam 13 along its length. This structure increases control over its flatness which would have a natural tendency to distort after single-sided etching. Flatness of load beam 13 is a critical aspect to improving the dynamic response of suspension 11. It is very difficult if not impossible for suspension manufacturers to fine tune their load beam forming dies to create perfectly flat load beams.

The double-sided etching of load beam 13 produces rearward pockets 21 on its lower surface, central pockets 23 on its upper surface, a lower central pocket 19 on its lower surface, forward pockets 25 on its upper surface, and forward pockets 64 on its lower side. There is no overlap between these pockets from top to bottom. After the material of load beam 13 is etched away in pockets 21, 23, 25, 19, 64, load beam 13 resembles a truss-like rib structure having a rearward, downward-protruding rib portion 31, a central, upward-protruding rib portion 33, a forward, upward-protruding rib portion 35, and a tip downward-protruding rib portion 65. Note that the thickness of load beam 13 in pockets 21, 23, 25, 19, 64 is half of its original thickness or less (approximately 1.5 mils), as represented by the thickness of rib structure portions 31, 33, 35, 65. Pockets 21, 23, 25, 19, 64 define rib-type members between them.

Mount plate 15 has a swage spud 37 and is spot welded to the lower surface of rearward portion 31 of load beam 13 at weld points 41. The central portion of flexure 17 is a truss-like member and is welded to the upper surface of central portion 33 at weld points 43. The forward portion of flexure 17 is similar and welded to the upper surface of forward portion 35 at weld points 45. Note that the forward-most end of flexure 17 is not welded to load beam 13 and is free to flex relative thereto.

The joining of mount plate 15 and flexure 17 to portions 31, 33, 35 creates three, box-like structural regions which perform different functions for suspension 11. Mount plate region 51 is on the rearward end of suspension 11 and forms a thick, rigid structure to which it is mounted on a motor support arm (not shown). Pockets 21 enhance the dynamics of suspension 21. Central region 53 is substantially defined along the length of flexure 17 and provides a low mass, rigid extension from the stiffer mount plate region 51. Forward region 55 extends along the length of flexure 17 to form a longer, low mass, rigid triangular structure with truss-like ribs. Both regions 53, 55 enhance the dynamics of suspension 11 for higher tracking-per-inch. A partially-etched hinge region 57 is located directly between regions 53, 55 for improved flexibility and a lower vertical stiffness required by air bearing.

After load beam 13 has been etched, a dimple 61 is press-formed into its forward triangular tip. The forwardmost end of flexure 19 is deflected upward slightly by dimple 61 and forms a support extension or load/unload tab 63 for the sliders or magnetic read/write heads that suspension 11 will carry. Tab 63 may be formed by partial etching followed by conventional metal forming techniques in its semicircular sections.

Referring now to FIG. 3, second embodiment of the invention is depicted as suspension 111. Suspension 11 comprises a central load beam 113, a mount plate 115 on the rearward end of its lower surface and a flexure 117 at the forward end of its lower surface.

Like load beam 13, load beam 113 is formed from a specimen having an original and uniform thickness of approximately 4 mils, and was subjected to a single pass of double-sided etching in selected areas to reduce its thickness. Load beam 113 has rearward pockets 121 on its lower surface, central pockets 123 on its lower surface, and forward pockets 125 on its upper surface at its forwardmost end. These pockets are formed simultaneously on both sides of load beam 113 at the same points so that load beam 113 is completely symmetrical from top to bottom with regard to the pockets. Pockets 123 form a truss-like rib structure near the front of suspension 111. The thickness of load beam 113 in pockets 121, 123, 125 is less than half of its original thickness (indicated by shading). The unshaded areas of suspension 111 are at the original thickness of load beam 113. Mount plate 115 is welded to the lower surface of load beam 113 over pockets 121, and flexure 117 is welded over pockets 123. With pockets 125, the front end of flexure 117 acts as a load/unload tab 127 and may be flexed relative to load beam 113.

The joining of mount plate 115 and flexure 117 to load beam 113 creates two, box-like structural regions. Mount plate region 151 forms the rearward half of suspension 111 and is a thick, rigid structure which mounts on a motor support arm (not shown). Forward region 153 is substantially defined along the length of flexure 117 and provides a low mass, rigid extension from the stiffer mount plate region 151. Both regions 151, 153 enhance the dynamics of suspension 111 for higher tracking-per-inch. An etched hinge region 157 is located directly between regions 151, 153 for improved flexibility. After load beam 113 is etched, any necessary press forming operations may be performed.

Figure 4:
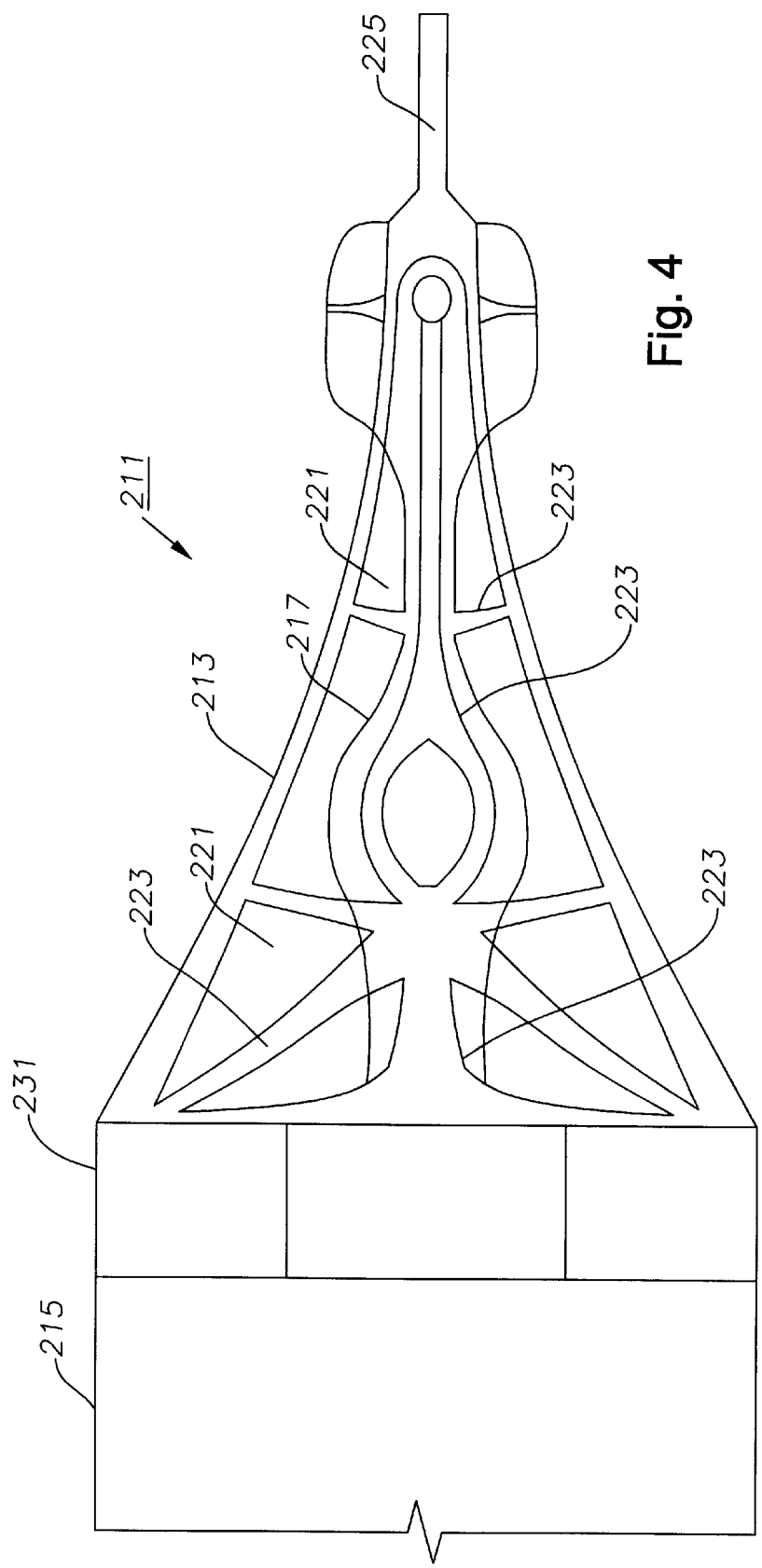
FIG. 4 is a top view of a third embodiment of the suspension of FIG. 1.

Referring now to FIG. 4, a third embodiment of an integrated lead suspension 211 for a high density hard disk drive is shown. Suspension has a profile that is formed into a parabolic-like, curvilinear shape. Suspension 211 comprises a central load beam 213, a mount plate 215 on the rearward end of its lower surface, and a flexure 217 at the forward end. Load beam 213 is formed from a specimen having an original and uniform thickness of approximately 4 mils.

Like the previous load beams, load beam 213 was subjected to partial etching in selected areas to reduce its thickness. The double-sided, partial etching of load beam 213 produces pockets 221 along its upper and/or lower surface which are much thinner than the original material (approximately one-half). The parabolic-shaped load beam 213 is left with a truss-like rib structure having a plurality of generally parabolic-shaped ribs 223 that increase the dynamic frequencies of selected modes by 50%.

Mount plate 215 is welded to the rearward end of load beam 213, and flexure 217 is welded to the front end of load beam 213. The front end of flexure 217 is not welded to load beam 213 and is free to flex relative thereto as a load/unload tab 225. As described above, the joining of mount plate 215 and flexure 217 creates two reinforced box-like structural regions with a hinge portion 231 located therebetween. Hinge portion 231 allows the region along flexure 217 to flex relative to the region around mount plate 215.

The invention has several advantages. The suspension has portions which are selectively etched such that no additional stiffening operations are required. The etched suspension has higher dynamic frequencies and more than triples the servo band width. The suspension also has a full emil thickness at the load beam/flexure weld points to minimize the load beam's deformation. The tooling pin contact is also thick-walled for improved alignment and tolerances. The suspension is stronger, lighter and has lower inertia. The load/unload tab is also partially etched for improved dynamics. The suspension can be welded to a swage mount plate or arm, and can be manufactured for adhesive bonding. This configuration minimizes air flow induced vibration while increasing the resonant frequencies of the suspension with minimized inertia. Since the process utilizes standard etching procedures and eliminates the need for additional forming operations such as flanges or bubble formations, the suspension cost is reduced.

While the invention has been shown or described in only some of its forms, it should be apparent to those skilled in the art that it is not so limited, but is susceptible to various changes without departing from the scope of the invention.

We claim:

1. An integrated lead suspension for a disk drive, comprising:
   a planar load beam having first and second oppositely facing surfaces and first and second pockets partially etched in the first and second surfaces, respectively, the load beam also having a section with a thickness that is less than half of an original thickness of the load beam;
   a load/unload tab extending from the load beam;
   a mount plate mounted to the load beam adjacent to the first pocket to form a first box-like structure for stiffening the suspension and greater flatness control;
   a flexure mounted to the load beam adjacent to the second pocket to form a second box-like structure for stiffening the suspension and greater flatness control; and wherein
   at least one of the first pockets aligns with one of the second pockets to define the section, such that a segment of the load beam located between the first and second pockets has a pocket thickness that is less than half of the original thickness of the load beam.

2. The integrated lead suspension of claim 1 wherein the segment of the load beam is approximately one-third of the original thickness of the load bean.

3. The integrated lead suspension of claim 1, further comprising a third pocket formed in the load beam adjacent to the load/unload tab, and wherein at least some of the pockets are formed into a truss-like structure having ribs.

4. The integrated lead suspension of claim 1, further comprising a hinge formed in the load beam between the first and second pockets.

5. An integrated lead suspension for a disk drive, comprising:
   a planar load beam having first and second oppositely facing surfaces, at least one of which is partially etched to form a pocket on a mounting end of the load beam and a pocket on a flexure portion of the load beam that is offset from the pocket on the mounting end, each of the pockets having a depth that is more than half of an original thickness of the load beam and greater flatness control;

a mount plate mounted to the load beam over the pocket on the mounting end to form a first box-like structure for stiffening the integrated lead suspension and greater flatness control; and a flexure mounted to the load beam over the pocket on the flexure portion to form a second box-like structure for stiffening the integrated lead suspension, the flexure having a load/unload tab extending from the load beam.

6. The integrated lead suspension of claim 5 wherein the pocket on the mounting end is formed in the first surface of the load beam, and the pocket on the flexure portion is formed in the second surface of the load beam.

7. The integrated lead suspension of claim 5 wherein the pockets are formed in the same surface of the load beam.

8. The integrated lead suspension of claim 5 wherein at least one of the mounting end and the flexure portion are formed into truss-like structures having ribs defined by the pockets.

9. The integrated lead suspension of claim 5, further comprising at least one pocket etched in one of the surfaces in a forward portion of the load beam adjacent to the load/unload tab.

10. The integrated lead suspension of claim 5, further comprising at least one pocket etched in one of the surfaces in a hinge portion formed in the load beam between the mounting end and flexure portion.

11. The integrated lead suspension of claim 5 wherein the thickness of the pockets is approximately two-thirds of the original thickness of the load beam.

12. An integrated lead suspension for a disk drive, comprising:

a planar load beam having first and second oppositely facing surfaces, at least one of which is partially etched to form pockets therein, each of the pockets having a depth that is at least half of an original thickness of the load beam;

a mount plate on a rearward end of the load beam that forms a first box-like structure for stiffening the integrated lead suspension and greater flatness control;

a flexure on a forward end of the load beam opposite the mount plate that forms a second box-like structure for stiffening the integrated lead suspension and greater flatness control, the flexure having a load/unload tab extending from the load beam;

a hinge in the load beam between the mount plate and the flexure that allows a portion of the load beam adjacent to the flexure to flex relative to a remainder of the mount plate; and wherein the load beam has a curved, parabolic profile with a truss-like rib structure having a plurality of generally parabolic-shaped ribs for increasing dynamic frequencies of the suspension.

13. The integrated lead suspension of claim 12 wherein the pockets are formed in both surfaces of the load beam.

14. The integrated lead suspension of claim 12 wherein a front end of the flexure is unattached relative to load beam such that the front end of the flexure is free to flex relative to the load beam.

* * * * *

UNITED STATES PATENT AND TRADEMARK OFFICE
CERTIFICATE OF CORRECTION

PATENT NO.   : 6,219,203 B1
DATED        : April 17, 2001
INVENTOR(S)  : Arya, et al.

It is certified that error appears in the above-identified patent and that said Letters Patent is hereby corrected as shown below:

<u>Column 3,</u>
Line 13, please delete "11" and insert -- 111 --.

Signed and Sealed this

Twenty-eighth Day of August, 2001

*Attest:*

NICHOLAS P. GODICI
*Attesting Officer*   *Acting Director of the United States Patent and Trademark Office*